US008611190B1

(12) United States Patent
Hughes et al.

(10) Patent No.: US 8,611,190 B1

(45) Date of Patent: Dec. 17, 2013

(54) BIO-ACOUSTIC WAVE ENERGY TRANSDUCER

(75) Inventors: Derke R. Hughes, Warwick, RI (US); Richard A. Katz, East Lyme, CT (US); Albert H. Nuttall, Old Lyme, CT (US); John R. Cooley, Storrs, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 274 days.

(21) Appl. No.: 13/246,951

(22) Filed: Sep. 28, 2011

(51) Int. Cl.

| | |
|---|---|
| ***H04B 3/00*** | (2006.01) |
| ***H04R 3/00*** | (2006.01) |
| ***H04R 27/04*** | (2006.01) |
| ***H04R 17/00*** | (2006.01) |

(52) U.S. Cl.
USPC ................ 367/180; 381/77; 381/75; 381/117

(58) Field of Classification Search
USPC ....................................... 381/77, 75; 367/180
See application file for complete search history.

(56) References Cited

U.S. PATENT DOCUMENTS

| | | | | |
|---|---|---|---|---|
| 5,859,915 | A * | 1/1999 | Norris | 381/75 |
| 8,199,931 | B1 * | 6/2012 | Norris et al. | 381/97 |
| 2002/0126854 | A1 * | 9/2002 | Norris et al. | 381/77 |
| 2004/0161122 | A1 * | 8/2004 | Nielsen | 381/117 |
| 2005/0100181 | A1 * | 5/2005 | Croft et al. | 381/190 |
| 2005/0226438 | A1 * | 10/2005 | Norris et al. | 381/77 |
| 2006/0233404 | A1 * | 10/2006 | Croft et al. | 381/191 |
| 2008/0298175 | A1 * | 12/2008 | LaWhite et al. | 367/89 |
| 2010/0195443 | A1 * | 8/2010 | Lawhite et al. | 367/87 |

* cited by examiner

*Primary Examiner* — Isam Alsomiri
*Assistant Examiner* — Hovhannes Baghdasaryan
(74) *Attorney, Agent, or Firm* — James M. Kasischke; Jean-Paul A. Nasser; Michael P. Stanley

(57) ABSTRACT

A method and apparatus is taught for a signal processing breakthrough that significantly alleviates the "Curse of Dimensionality" (COD) in the characterization of nonlinear physical systems; namely, the reduction in the number of coefficients used to describe the higher order (i.e., nonlinear) kernels in the Volterra series expansion. The latter technique provides the means to evaluate simultaneously from a wide band excitation, all the inter-modulation products up to a specified order by greatly reducing the number of coefficients in the higher order kernel estimation to a manageable set that can be easily manipulated by current personal computers used to enhance a finite element (FE) model that generates a bio-inspired acoustic transducer model.

2 Claims, 9 Drawing Sheets

BIO-ACOUSTIC WAVE ENERGY TRANSDUCER

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to transducers, and more specifically to an acoustic wave transducer that functions based on the same transduction principles found in cicadas, designed by means of efficient computation of the higher order (i.e., nonlinear) kernels in a Volterra or Wiener expansion used to validate the transducer model.

(2) Description of the Prior Art

Cicadas emit one of the loudest sounds in all of the insect population despite their relatively small size. A cicada's sound production system allows for propagation distances of approximately one quarter of a mile for the periodic cicada and beyond a mile for some annual cicadas. The sound level for some species is over 120 dB relative to (the intensity of a plane wave of) pressure equal to 20 micro-Pascals. This represents an exceptional transmission distance for the size of the sound production system. The cicada's highly effective sound-production system occupies a physical space typically less than 3 cubic centimeters. Males create sound by flexing a pair of ridged abdominal membranes called tymbals. The cicada uses its tymbal muscle to pull the tymbal, which causes the tymbal ribs to buckle releasing sound impulses. The sounds made by these tymbals are amplified by the hollow abdomen functioning as a tuned resonator. The cicada song has been classically modeled using linear mathematical methods. Unfortunately, these linear methods are insufficient for a true model of the system because the non-elastic (i.e., nonlinear) buckling tymbals of the cicada sound production system are essential to the acoustic level and propagation of the sound. The present invention is a method and apparatus that emulates the cicada sound production system. This bio-inspired method and apparatus potentially provides a precision method for improved detection, classification and generation of acoustic signals in air and in water.

Most acoustic signal processing methods in use today are based on a first order (linear) kernel estimation. Whenever higher order kernels exist in physical systems, these kernels will masquerade as noise in a first order approximation. By uncovering the higher order kernels in physical systems, new possibilities exist for achieving significant computational gains in receiver signal-to-background interference levels not possible using linear methods. Moreover, the signal content of these higher order kernels, once detected, can provide new and useful information about an acoustic signal source.

Previous work in acoustic signal processing has demonstrated a utility in the application of the Volterra series expansion and other nonlinear methods for the exploitation of signals via application of a Volterra and/or Wiener signal processing procedure to measure and quantify higher-order non-linearities. The present invention teaches a signal processing breakthrough that significantly alleviates the "Curse of Dimensionality" (COD) in the characterization of nonlinear physical systems; namely, the reduction in the number of coefficients used to describe the higher order (i.e., nonlinear) kernels in the Volterra series expansion used to validate the finite element (FE) model that is instrumental in the development of the transducer model. The latter technique provides the means to evaluate simultaneously from a wide band excitation, all the inter-modulation products up to a specified order by greatly reducing the number of coefficients in the higher order kernel estimation to a manageable set that can be easily manipulated by current personal computers.

SUMMARY OF THE INVENTION

It is a general purpose and object of the present invention to provide a method and apparatus that emulates the cicada sound production system.

It is also an object to uncover the higher order kernels in acoustic signal processing methods.

This object is accomplished by a signal processing breakthrough that significantly alleviates the "Curse of Dimensionality" (COD) in the characterization of nonlinear physical systems; namely, the reduction in the number of coefficients used to describe the higher order (i.e., nonlinear) kernels in the Volterra series expansion. The latter technique provides the means to evaluate simultaneously from a wide band excitation, all the inter-modulation products up to a specified order by greatly reducing the number of coefficients in the higher order kernel estimation to a manageable set that can be easily manipulated by current personal computers used to validate the finite element (FE) model that is instrumental in the development of the transducer model.

BRIEF DESCRIPTION OF THE DRAWINGS

A more complete understanding of the invention and many of the attendant advantages thereto will be readily appreciated and understood by referencing the following detailed description when considered in conjunction with the accompanying drawings wherein.

DETAILED DESCRIPTION OF THE INVENTION

To generate an accurate description of the acoustics of cicada sound production system, the physical dimensions and anatomical features of the cicada must be understood through a Finite Element (FE) model. The general functionality of the cicada's anatomy is accurately described in the scientific literature; although, the explicit details of the functionality are not known. Previous apparatus that has been based upon the cicada tymbal buckling does not accurately represent the structural acoustics produced by the insect as the present invention does. In a preferred embodiment, the core anatomy cicada sound production system is executed in a Finite Element (FE) computer model. The acoustical sounds are created by invoking an appropriate forcing function applied to the tymbal in order to simulate muscle motion (i.e., contraction and expansion) and tymbal rib buckling. In order to produce the acoustics, these anatomical structures are placed in a surrounding fluid of air and the forcing function loads are applied to the appropriate elements in the model to generate the sound. Alternatively, this finite element model is simulated in water in which hydrodynamic effects are compensated for as well.

Figure 1A:
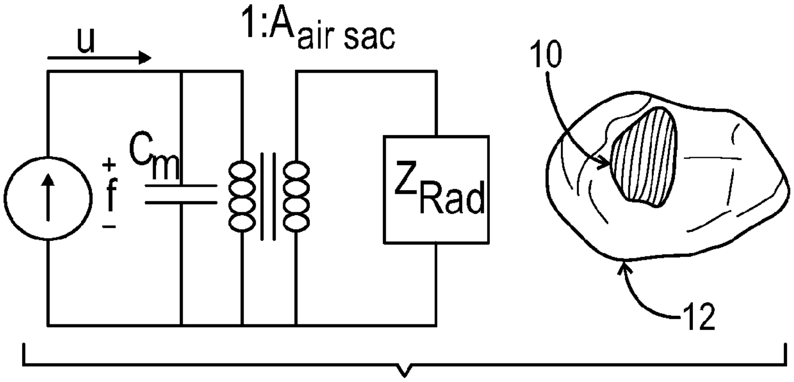
FIG. 1A is an illustration of the stages of a Finite Element bio-acoustic transducer design.
Figure 1B:
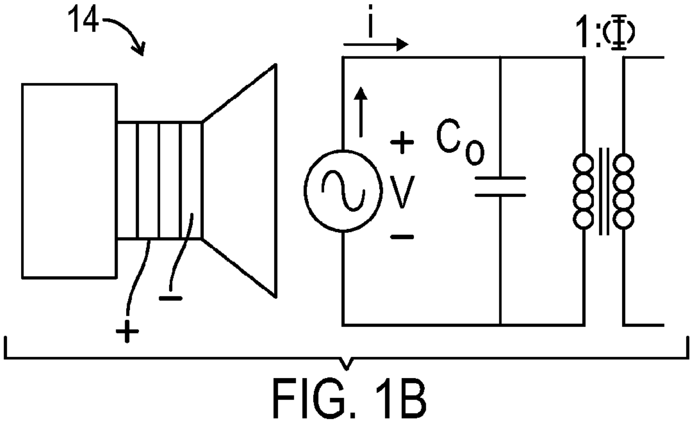
FIG. 1B is an illustration of the stages of a bio-acoustic transducer design.
Figure 1C:
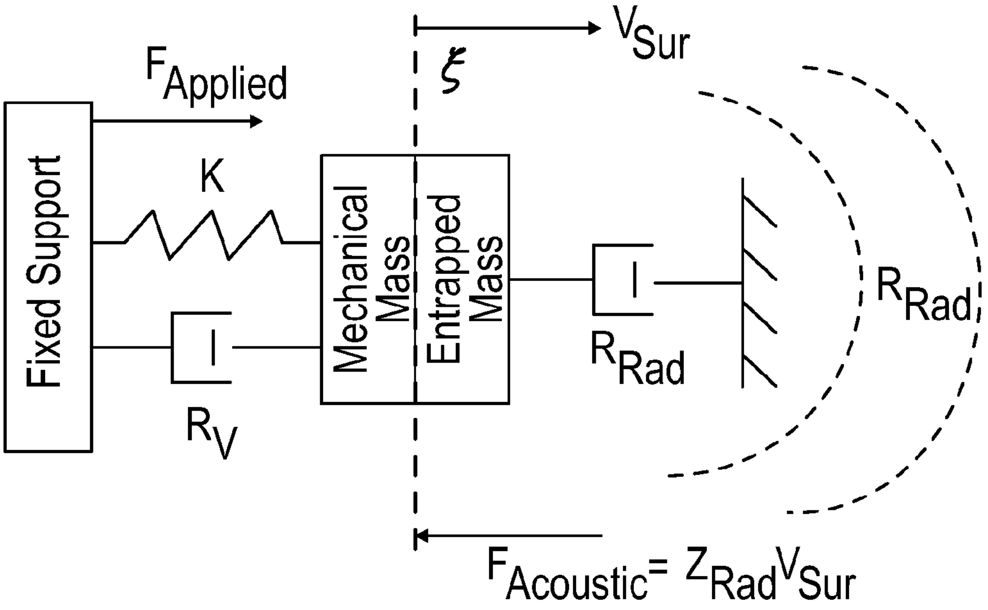
FIG. 1C is an illustration of the stages of a bio-acoustic transducer design.
Figure 2A:
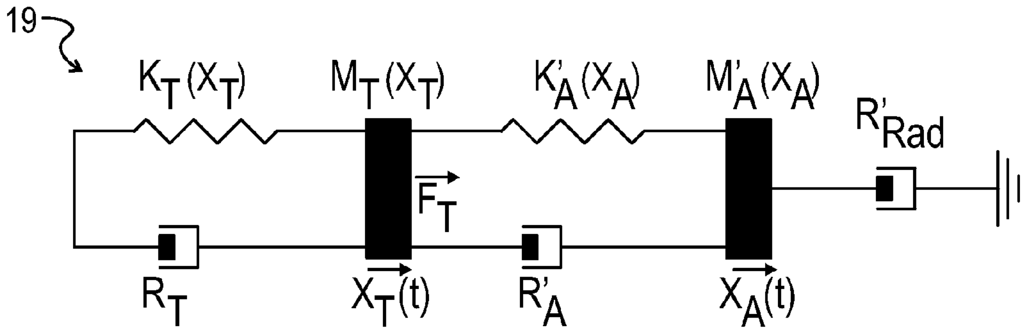
FIG. 2A is an illustration of schematic of the two degree of freedom coupled vibration system of the cicada sound generation system that simulates the tymbal excitation and abdominal cavity.

There are several steps in the translation of the FE model to a working device. The material properties designed by the FE model are translated into a transducer device as illustrated in FIGS. 1A, 1B, and 1C. The illustrated steps translate the cicada sound production system into the physical and material properties and dimensions (i.e., the spring-mass-damper system), which describe the apparatus for emulation of man-made acoustic sounds. ($F_{Applied}$ shown in the FIG. 1C is determined by emulating an experimental data set obtained from an actual tymbal signal). The tymbal 10, air sac 12 and Tonpilz transducer 14 electrical wire diagrams in the FIGS. 1A, 1B and 1C show the transformers, resistors, and capacitors required to convert material properties to an actual physical system in order to generate the desired acoustics. The process of translation of the FE model to a working device leads to the developing a two coupled systems model representing the (1) vibration of the tymbal plate and (2) the abdominal air sac. The cicada sound production system is modeled as a coupled two degree of freedom vibration system. Two schematics of the system are shown in FIG. 2A (the spring mass damper system 19) and 2B (the resonating cavity 21). The primed quantities indicate transformed quantities.

Figure 3:
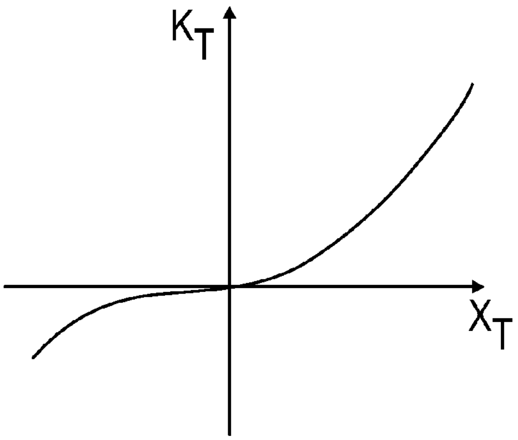
FIG. 3 is an illustration of the depiction of stiffness parameter as a function of time in the FE model.

The input force provided by the muscle contraction and expansion and subsequent inner and outer buckling of the tymbal ribs is represented by the force $F_T(t)$. The subscripts (T and A) stand for tymbal and abdomen, respectively. The tymbal vibrational system is represented by the equivalent stiffness $K_T(x_T)$, moving mass $M_T(x_T)$, and loss element $R_T$. The tymbal displacement is given by $x_T$. The lumped elements of the spring mass damper system 19 of FIG. 2A are modeled as nonlinear elements, and the nonlinear stiffness of the tymbal is modeled as a function of the tymbal displacement $x_T$ as shown in FIG. 3.

Figure 2B:
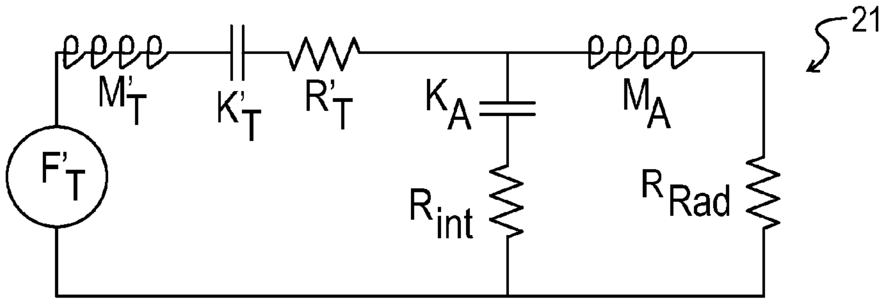
FIG. 2B is an illustration of schematic of the two degree of freedom coupled vibration system of the cicada sound generation system that simulates the tymbal excitation and abdominal cavity.

The wiring model 19 in FIG. 2A adjusts the different compliances of the tymbal motion in the outward and inward direction, as different slopes of the stiffness in the expansion or compression region. Adjustments are also made to the hardening or softening behavior found in the spring constant from the stiffness. Similarly, the consecutive mass loading of the tymbal by the buckled ribs is included via a nonlinear inertial element $M_T(x_T)$ and damper. The second schematic system, FIG. 2B, is akin to a 'linear acoustic' Helmholtz resonator, only it has been modified and adapted to the specific purpose of this invention as a 'nonlinear acoustic' resonator 21. The equivalent stiffness is $K_A(x_A)$, inertial element is $M_A(x_A)$, and internal damping is $R_{Int}(x_A)$. The acoustic displacement is represented by the displacement $x_A$. Here, the stiffness $K_A(x_A)$ is based on the air volume in the abdominal sac. The inertial element $M_A(x_A)$ is that of the moving mass of the tympana, and the inertial damping $R_{Int}(x_A)$ represents acoustic damping within the air in the abdominal sac. Again, nonlinear representations of the lumped elements are used. The schematic is terminated by the radiation resistance $R_{Rad}$, which represents the radiation of the sound away from the tympana. The excitation force $F_T$ is generated by the successive buckling of the ribs.

Equation (1) is a nonlinear system of ordinary differential equations representing the models in FIG. 2A and 2B. The nonlinear system is solved numerically. The nonlinear model computation is accomplished based on certain assumptions. Namely, the nonlinear stiffness is accomplished by motion of the tymbal plate mass. For example, the moving mass of the tymbal plate is the sum of the tymbal plate mass, one third of the mass of the dorsal resilin pad, and the mass of the first buckling rib during the buckle of a rib. The next buckling event, the mass of the second rib is added to the tymbal moving mass. Finally, for the third buckle the mass of the third rib is added to the moving mass. The example given is for a simple three rib cicada.

$$y_1 = x_T \quad y_3 = U_A \tag{1}$$

$$y_2 = \dot{x}_T \quad y_4 = \dot{U}_A$$

$$\dot{y}_1 = y_2$$

$$\dot{y}_2 = \frac{1}{M_T}[F_T - R_T y_2 - (K_{Res} + K_{Rib})y_1 + S_T K_A(y_3 - S_T y_1) + S_T R_{Int}(y_4 - S_T y_2)]$$

$$\dot{y}_3 = y_4$$

$$\dot{y}_4 = \frac{1}{M_A}[K_A(S_T y_1 - y_3) + R_{Int}(S_T y_2 - y_4) - R_{Rad} y_4]$$

Figure 4:
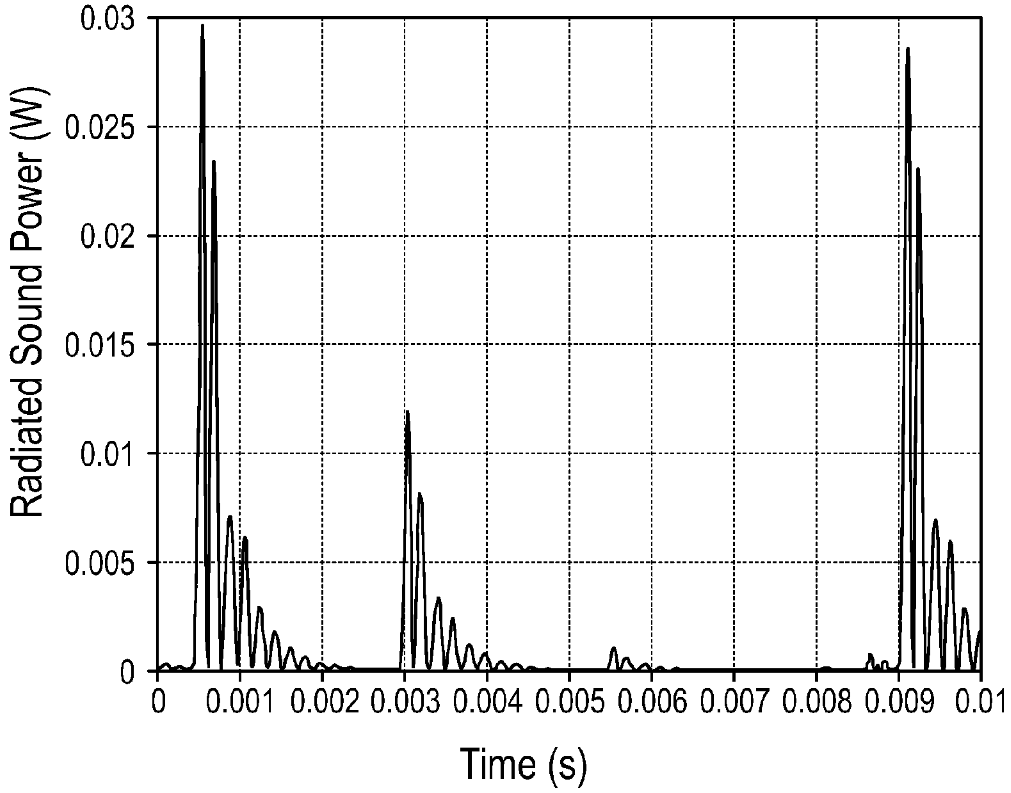
FIG. 4 is an illustration of a graph of radiated acoustic power (W) versus time (s) during one sequence of three buckling ribs.

The results of the dynamic analyses were done with slightly different values of the dynamic stiffness, once the ribs start to buckle, the stiffness of the ribs were set to zero, and the only remaining stiffness was the dorsal pad. FIG. 4 shows the radiated acoustic power for the combination of tymbal displacement and acoustic pressure in the abdominal air sac. The time window used for the analyses is a little larger than the time to have three ribs buckle. Finally, the analysis yields a peak power of 30 mW for this model. Several variations that include additional nonlinear effects and refinements are also possible for someone skilled in the art. These include variations in: nonlinear stiffness, successive rib buckling, tymbal plate mass, air sac mass and abdominal cavity volume.

Figure 5:
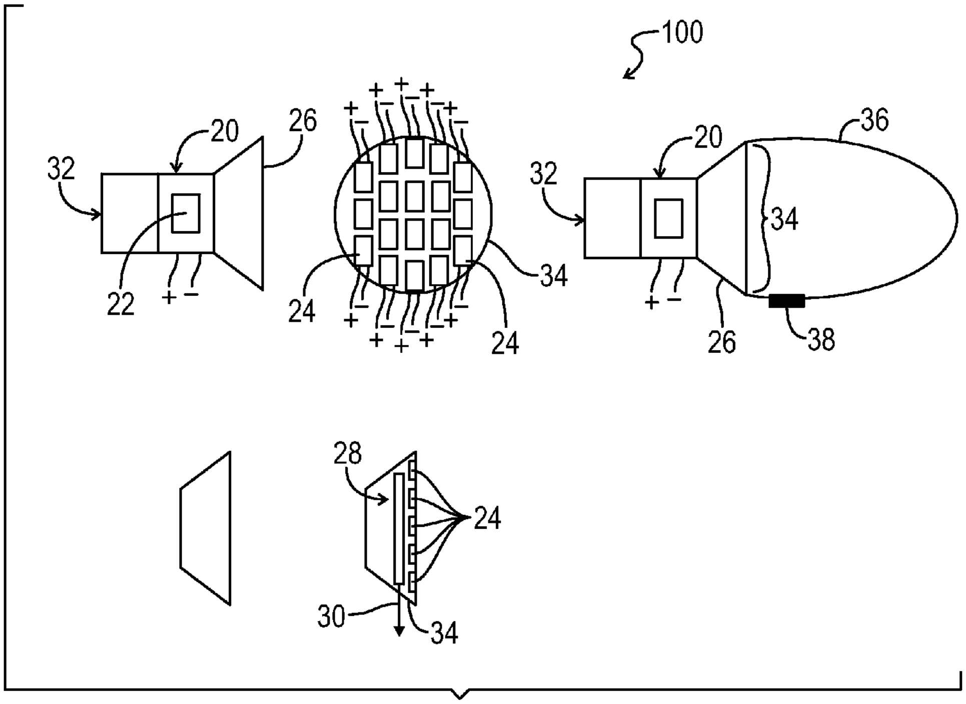
FIG. 5 is an illustration of a preferred embodiment of the apparatus for a nonlinear sound production system of the present invention.

Referring now to FIG. 5 there is a preferred embodiment of the apparatus for a nonlinear sound production system of the present invention. FIG. 5 provides an overview description of the electronics and components required to create a transducer 100 based upon the cicada nonlinear sound production system. In a preferred embodiment, there is an electronic control suite 20 containing a programmable digital processor with a non-volatile memory component 22 (e.g. PC104 or GumStix®). The processor 22 is programmed with an algorithm designed to operate a series of or arrays of discrete ceramic elements 24 made of a piezo-electric material arranged in a housing 26. The housing 26 is filled with a resin 28 that holds the discrete ceramic elements 24 in place at the transducer face 34. The housing 26 also contains an electronic circuit board 30 that is wired to each discrete ceramic element 24. The arrays of discrete ceramic elements 24 are actuated with voltage inputs originating from an electrical power source 32 (in a preferred embodiment the power source 32 is a direct current source such as a battery) initiated by the electronic control suite 20, which generate compression and contractions in each discrete ceramic element 24 in a non-linear manner that emulates the cicada sound production system. The electronic control suite 20 regulates which discrete ceramic elements 24 are activated in series or parallel for particular regions within the element array. Therefore, the discrete ceramic elements 24 generate mode shapes on the transducer face 34 that emulate the cicada tymbal face. The discrete ceramic elements 24 control activation replaces the physical tymbal ribs functionality. Therefore, the complex mode shapes produced at the transducer face 34 are analogous to the complex modes created by the cicada sound production system. The resonating chamber 36 emulates the cicada abdomen resonator and the operculum 38 is the opening from which sound propagates. The transducer 100 forms similar waveforms as the cicada sound production system, with similar acoustic efficiency. The acoustic components generate nonlinear waveforms by emulating the elastic buckling impulse trains of the tymbal ribs repeated several hundred times a second.

The Volterra-Wiener model assesses the higher-order dynamics present in both the cicada and transducer 100 acoustic wave forms. Then, the FE-based model provides the material properties used in the design of the transducer model. Using the experimental data obtained from live insect vocalizations, the Volterra-Wiener expansion model authenticates the emulated sound outputs. The nonlinear sound production system apparatus creates the high-order structural acoustics found in actual cicada vocalizations.

Nonlinear system excitation x(t) is sampled at frequency $f_s$ Hz, resulting in time-sampling increment $\Delta=1/f_s$ seconds and sampled sequence $\{x(n\Delta)\}$. For simplicity of notation, the $\Delta$ symbol will be suppressed in equation (2) and is comparable to the $x_T$ in equation (1) and the excitation sequence will be denoted simply by $\{x(n)\}$. Later in equation (2), $\Delta$ will be kept in order to stress the time dependence. Moreover, the excitation input sequence $\{x(n)\}$, the actual sampled output sequence $\{z(n)\}$ and model sampled output sequence $\{y(n)\}$ in equation (2) and is equivalent to the y solution in equation (1), which is referred to as waveforms.

Consider a time-invariant nonlinear system with actual sampled input sequence $\{x(n)\}$ and actual sampled output sequence $\{z(n)\}$, both of which are sampled at the same rate $f_s$ and recorded simultaneously. The causal time-invariant Volterra model sampled output sequence $\{y(n)\}$ is then given, to third order, by:

$$y(n) = h_0 + \sum_{k_1=0}^{K-1} h_1(k_1)x(n-k_1) + \sum_{k_1=0}^{K-1}\sum_{k_2=0}^{K-1} h_2(k_1,k_2)x(n-k_1)x(n-k_2) + \tag{2}$$

-continued $$\sum_{k_1=0}^{K-1}\sum_{k_2=0}^{K-1}\sum_{k_3=0}^{K-1} h_3(k_1,k_2,k_3)x(n-k_1)x(n-k_2)x(n-k_3)$$

$$\equiv y_0 + y_1(n) + y_2(n) + y_3(n),$$

where $h_0$, $h_1$, $h_2$, $h_3$ are the zeroth-order through third-order (time-invariant) time-domain kernels of the Volterra expansion. It is assumed that the Volterra kernels $h_0$, $h_1$, $h_2$, $h_3$ are represented with the same time-sampling increment as used for the nonlinear system input and output waveforms x(n) and z(n). It is also assumed for simplicity that the same "memory length" K in equation (2) is appropriate for all three orders of these kernels. Different sizes $K_1$, $K_2$, $K_3$ of the summations may be considered in an alternative form of equation (2).

The unknowns in the Volterra expansion in equation (2) are the four kernels $h_0$, $h_1$, $h_2$, $h_3$ which appear linearly in the model output y(n). A least squares approach is used to fit model output y(n) to the actual measured nonlinear system output z(n); See FIG. 6. The major problem associated with the Volterra expansion is the curse of dimensionality (COD), namely, the extreme number of coefficients (kernel values) required in equation (2). At first order, the number of coefficients that must be determined is $M_1=K$; at second order, the number of coefficients is approximately $M_2=K^2/2$; and at third order, it is approximately $M_3=K^3/6$. In the normal equations that arise in least squares, the size of the data product matrix that must be inverted is M×M. The $M_2\times M_2$ case can often be solved with current-day computer random access memory (RAM), but the $M_3\times M_3$ matrix will often not fit into RAM. If a simultaneous fit of all the components in equation (2) to measured nonlinear system output z(n) were of interest, the desired RAM requirements could exceed that which is achievable by modern computer memory storage allocations.

Figure 7:
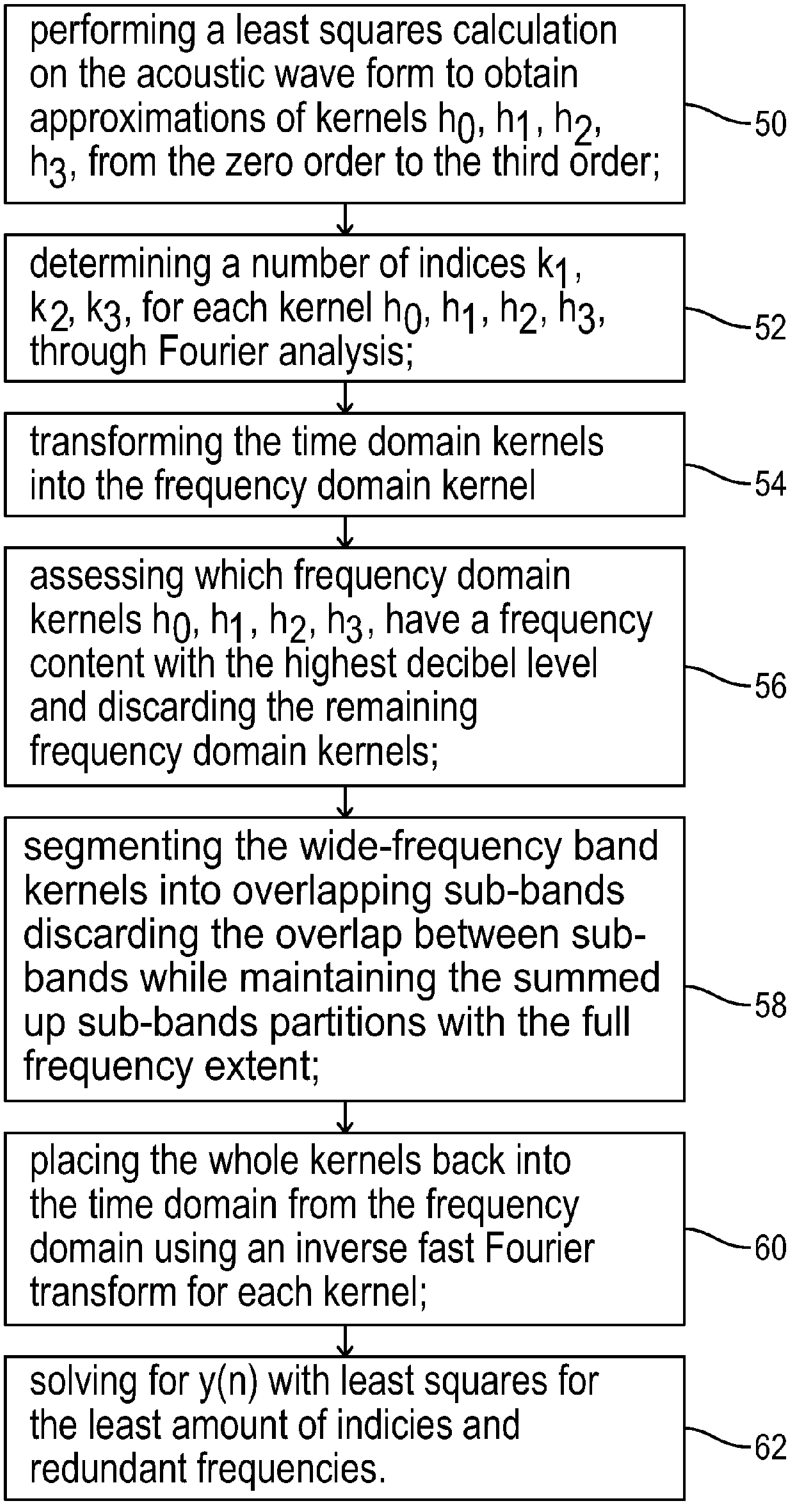
FIG. 7 is an illustration of the flow chart of the method of the Volterra signal processing for a third-order solution.

The present invention describes a method devised of partitioning the various kernels so that meaningful useful estimates are obtainable at higher orders and can be obtained by a modern computer. Referring to FIG. 7, the procedure entails performing a least squares calculation on the acoustic wave form to obtain approximations of kernels $h_0$, $h_1$, $h_2$, $h_3$ from the zero order to the third order 50, determining a number of indices $k_1$, $k_2$, $k_3$ for each kernel $h_0$, $h_1$, $h_2$, $h_3$ through Fourier analysis 52, transforming the time domain kernels into the frequency domain kernels 54, assessing which frequency domain kernels $h_0$, $h_1$, $h_2$, $h_3$ have a frequency content with the highest decibel level and discarding the remaining frequency domain kernels 56, segmenting the wide-frequency band kernels into overlapping sub-bands and discarding the overlap between sub-bands while maintaining the summed up sub-band partitions with the full frequency extent 58, placing the whole kernels back into the time domain from the frequency domain using an inverse fast Fourier transform for each kernel 60 and solving for y(n) with least squares for the least amount of indicies and redundant frequencies 62.

Figure 6:
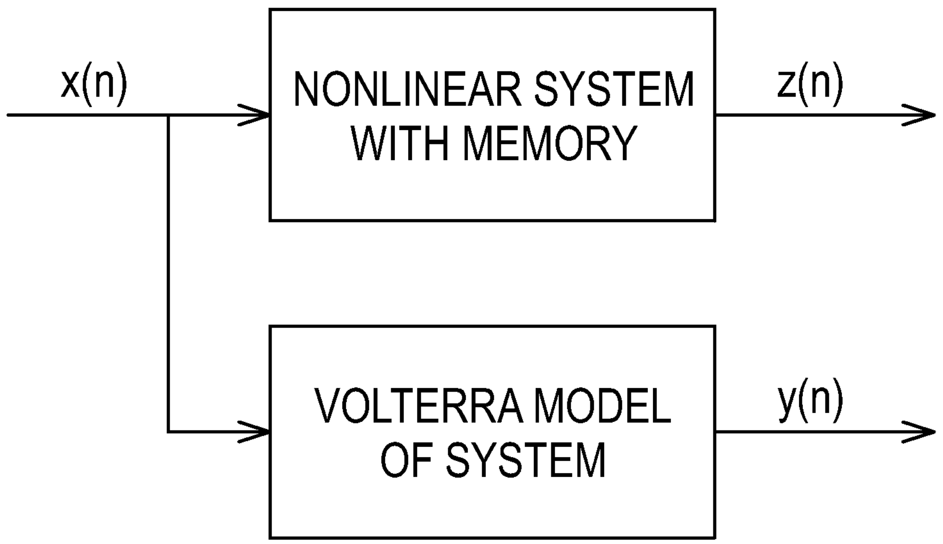
FIG. 6 is an illustration of the measurement and fitting procedure.
Figure 8:
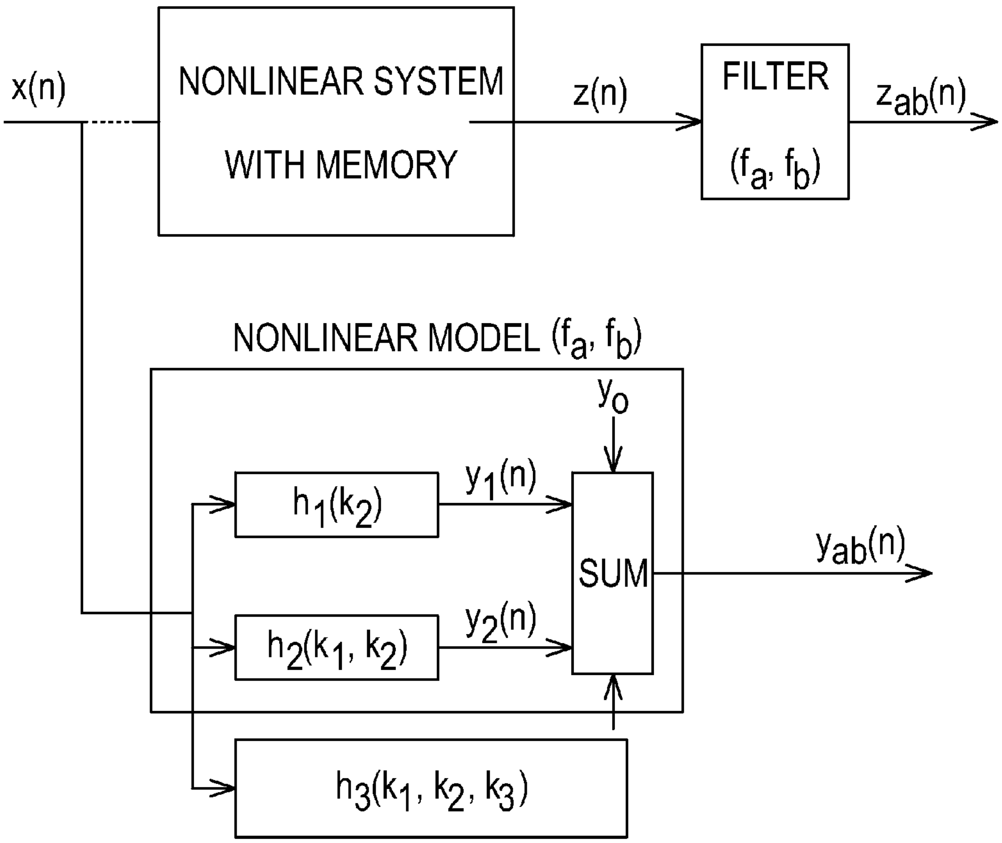
FIG. 8 is an illustration of the method of the Volterra signal processing for a third-order solution.

As illustrated in FIG. 8 for the case of a second order kernel, model response y(n) is compared with nonlinearity z(n), using a least squares procedure as shown in FIG. 6. The comparison can be conducted band-by-band in frequency. The equations determining the best kernels ($h_0$, $h_1$, $h_2$, $h_3$) are the solutions (y(n)) of simultaneous linear equations in the least squares sense. The usefulness of this technique is illustrated in FIGS. 8 and 9.

Figure 9:
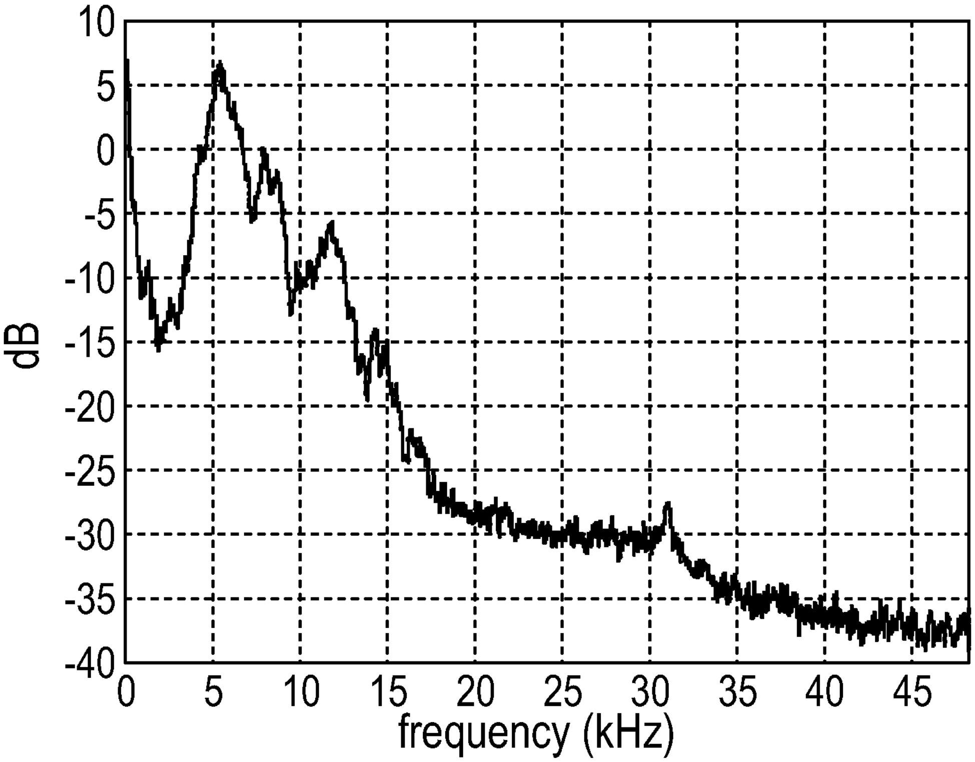
FIG. 9 is an illustration of a spectral representation of second order modeled output of the bio-acoustic signal.
Figure 10:
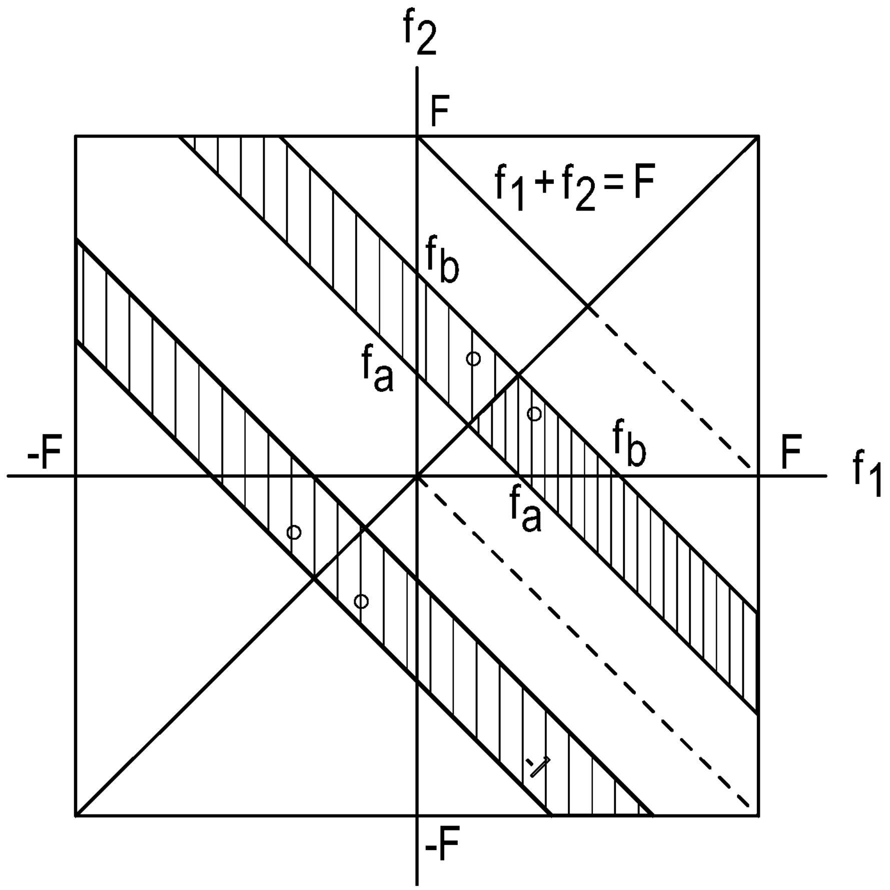
FIG. 10 is an illustration of diagonal strips in $f_1,f_2$-plane depicting second-order kernel construction.

Referring to FIG. 9, a spectral representation of the second-order modeled output for a cicada bio-acoustic signal in air is plotted. Note there are several peaks in the spectral plot near 0, 6, 8 and 12 kHz, lower amplitude peaks around 14 and 17 kHz, and an even lower peak near 31 kHz. The peaks in the frequency spectrum provide some information about the nonlinearity from which the spectrum is generated (for example, a peak amplitude at 6 kHz) but do not provide the details of all the possible nonlinear interactions (i.e., all the frequency inter-modulation contributions) that are used to derive the 6 kHz amplitude peak in the spectrum. However, Volterra equations are derived and a model is calculated to include all contributions from inter-modulation products in the kernel estimate that contribute to the (modeled) broadband spectrum of the acoustic signal (FIG. 9). A two dimensional template for the third-order kernel construction of the feasible intermodulation products is shown in FIG. 10.

The equations for this illustrated second-order kernel are as follows:

$$y_2(n\Delta)=\Delta^2\iint df_1 df_2 \exp[i2\pi(f_1+f_2)n\Delta]H_2(f_2)X(f_1)X(f_2). \quad (3)$$

Note that this is not a double Fourier transform; there is only one time variable on the right-hand side, namely, nΔ, where Δ is the sampling interval. Note also that the only place that time variable nΔ appears on the right-hand side of equation (3) is with the frequency combination $f_1+f_2$. If second-order Volterra output $y_2(n\Delta)$ is to have frequency content only in the band $(f_a,f_b)$ for purposes of fitting to a corresponding filtered version of z(nΔ) and if X(f) is broadband, then second-order frequency-domain kernel $H_2(f_1,f_2)$ must be restricted to be nonzero only for $$f_a<f_1+f_2<f_b \quad (4)$$

(and the corresponding negative frequencies). This condition allows complex exponential in equation (3) to take on frequency variation only in the band $(f_a,f_b)$. The region in equation (4) is definitely not square in $f_1,f_2$ space. Rather, see the shaded regions in FIG. 10.

Equation (4) describes an infinite strip at angle −45° in the $f_1,f_2$ plane, with perpendicular width $(f_b-f_a)/\sqrt{2}=W/\sqrt{2}$. However, the fundamental region is limited to be below the +45° line in the $f_1,f_2$ plane. In addition, frequency $f_b$ cannot exceed the limit F. The shape of this finite confined strip in the $f_1,f_2$ plane is similar to the shape of the state of Nevada. This is the restricted region of $f_1,f_2$ space in which $H_2(f_1,f_2)$ is allowed to be nonzero if $y_2(n\Delta)$ in equation (3) is to contain frequency content limited to the frequency range $(f_a,f_b)$.

One of the advantage of the present invention over the prior art is the alleviation of the COD at second and higher orders. This break through provides new possibilities for characterization of nonlinear physical systems. There are a number of applications including acoustic transmission and reception devices in water (e.g., sonar) and in air (e.g., sound systems). Another advantage of the present invention is the ability to quantify nonlinear systems obtained from Volterra-Wiener methods, which extends to analyzing nonlinear channels. Utilizing the cicada's efficient sound propagation technique broadens the knowledge of constructive and deconstructive interference, which may extend to higher frequencies applications.

In light of the above, it is therefore understood that within the scope of the appended claims, the invention may be practiced otherwise than as specifically described.

What is claimed is:

1. A nonlinear acoustic wave producing apparatus comprising:

a conical housing filled with a resin that holds an array of a plurality of discrete ceramic elements made of a piezoelectric material;

an electronic circuit board that is contained in said conical housing and is wired to each of said plurality of discrete ceramic element;

an electronic control suite containing a programmable digital processor with a non-volatile memory component wherein the programmable digital processor is programmed with an algorithm designed to operate the array of a plurality of discrete ceramic elements, wherein the algorithm initiates the digital processor to perform the steps of providing a digital acoustic wave form;

performing a least squares calculation on the acoustic wave form to obtain approximations of kernels $h_0$, $h_1$, $h_2$, $h_3$ from the zero order to the third order;

determining a number of indices $k_1$, $k_2$, $k_3$ for each kernel $h_0$, $h_1$, $h_2$, $h_3$ through Fourier analysis;

transforming kernels $h_0$, $h_1$, $h_2$, $h_3$ into a frequency domain;

assessing which frequency domain kernels $h_0$, $h_1$, $h_2$, $h_3$ have a frequency content with the highest decibel level and discarding the remaining frequency domain kernels;

segmenting the remaining frequency domain kernels $h_0$, $h_1$, $h_2$, $h_3$ into equal overlapping sub-bands;

discarding the overlap between sub-bands;

summing the sub-bands representing segmented frequency domain kernels into whole kernels while taking into account Fourier symmetry property;

placing the whole kernels back into the time domain from the frequency domain using an inverse fast Fourier transform for each kernel; and solving for y(n) with least squares for the least amount of indices and redundant frequencies, where y(n) is expressed as $$\begin{aligned}y(n) = h_0 &+ \sum_{k_1=0}^{K-1} h_1(k_1)x(n-k_1) + \\ &\sum_{k_1=0}^{K-1}\sum_{k_2=0}^{K-1} h_2(k_1,k_2)x(n-k_1)x(n-k_2) + \\ &\sum_{k_1=0}^{K-1}\sum_{k_2=0}^{K-1}\sum_{k_3=0}^{K-1} h_3(k_1,k_2,k_3)x(n-k_1)x(n-k_2)x(n-k_3) \\ &\equiv y_0 + y_1(n) + y_2(n) + y_3(n);\end{aligned}$$

an electrical power source that actuates the array of a plurality of discrete ceramic elements with voltage inputs initiated by the electronic control suite, which generate compression and contractions in each discrete ceramic element in a non-linear manner that emulates the cicada sound production system; and a resonating chamber with an operculum, wherein the operculum serves as the opening from which sound propagates.

2. A method of generating a mathematical model of a nonlinear acoustic wave form using a programmable digital processor with a non-volatile memory component, comprising the steps of:

providing a digital acoustic wave form as input to the digital processor;

performing a least squares calculation on the acoustic wave form with said digital processor to obtain approximations of kernels $h_0$, $h_1$, $h_2$, $h_3$ from the zero order to the third order;

determining a number of indices $k_1$, $k_2$, $k_3$ for each kernel $h_0$, $h_1$, $h_2$, $h_3$ through Fourier analysis with said digital processor;

transforming kernels $h_0$, $h_1$, $h_2$, $h_3$ into a frequency domain with said digital processor;

assessing which frequency domain kernels $h_0$, $h_1$, $h_2$, $h_3$ have a frequency content with the highest decibel level with said digital processor and discarding the remaining frequency domain kernels with said digital processor;

segmenting the remaining frequency domain kernels $h_0$, $h_1$, $h_2$, $h_3$ into equal overlapping sub-bands with said digital processor;

discarding the overlap between sub-bands with said digital processor;

summing the sub-bands representing segmented frequency domain kernels into whole kernels while taking into account Fourier symmetry property with said digital processor;

placing the whole kernels back into the time domain from the frequency domain using an inverse fast Fourier transform for each kernel with said digital processor; and solving for y(n) with least squares for the least amount of indices and redundant frequencies, with said digital processor, where y(n) is expressed as $$y(n) = h_0 + \sum_{k_1=0}^{K-1} h_1(k_1)x(n-k_1) + \sum_{k_1=0}^{K-1}\sum_{k_2=0}^{K-1} h_2(k_1, k_2)x(n-k_1)x(n-k_2) + \sum_{k_1=0}^{K-1}\sum_{k_2=0}^{K-1}\sum_{k_3=0}^{K-1} h_3(k_1, k_2, k_3)x(n-k_1)x(n-k_2)x(n-k_3)$$

$$\equiv y_0 + y_1(n) + y_2(n) + y_3(n).$$

* * * * *